US006930682B1

(12) United States Patent
Livingston

(10) Patent No.: US 6,930,682 B1
(45) Date of Patent: Aug. 16, 2005

(54) SUBDIVISION OPERATION AND USER INTERFACE FOR VOLUME SCULPTING

(75) Inventor: Mark A. Livingston, Washington, DC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 277 days.

(21) Appl. No.: 09/988,594

(22) Filed: Nov. 20, 2001

(51) Int. Cl.$^7$ .............................................. G06T 17/00
(52) U.S. Cl. ...................................................... 345/420
(58) Field of Search ................................ 345/420, 423, 345/424

(56) References Cited

U.S. PATENT DOCUMENTS 6,369,834 B1 * 4/2002 Zilles et al. ................. 345/701

OTHER PUBLICATIONS

Yong Zhou, Baoquan Chen and Arie Kaufman. Multiresolution Tetrahedral Framework for Visualizing Regular Volume Data. In Proceedings of the conference on Visualization '97. IEEE Visualization, 1997, pp. 135-142.*
Eric Ferley et al., "Practical volumetric sculpting", The Visual Computer (2000) 16:469-480.
Shinji Mizuno et al., "Virtual sculpting and virtual woodcut printing", The Visual Computer (1998) 14:39-51.
R. Westermann et al., "Real-time exploration of regular volume data by adaptive reconstruction of isosurfaces", The Visual Computer (1999) 15:100-111.

Gunther Greiner et al., "Hierarchical tetrahedral-octahedral subdivision for volume visulation", The Visual Computer (2000) 16:357-369.
Tinsley A. Galyean et al., "Sculpting: An Interactive Volumetric Modeling Technique", Computer Graphics (Jul. 1991) 25(4):267-274.
Janis P. Y. Wong et al., "Virtual 3D Sculpting", J. Visualization and Computer Animation (Jul. 2000) 11(3):155-166.
Elvis Ko-Yung Jeng et al., "Moving Cursor Plane for Interactive Sculpting", ACM Transactions on Graphics (Jul. 1996) 15(3):211-22.
Mario Ohlberger et al., "Adaptive Projection Operators in Multiresolution Scientific Visualization", IEEE Trans. on Visualization and Computer Graphics (Jan./Mar. 1999) 5(1): 74-94.
Raj Shekhar et al., "Octree-Based Decimation of Marching Cubes Surfaces", Proceedings of IEEE Visualization '96 (Oct./Nov. 1996) 335-342.
Sidney W. Wang et al., "Volume Schlpting", ACM 1995 Symposium on Interactive 3D Graphics (1995) 151-156.
M. Ohlberger et al., "Hierarchical and Adaptive Visualization on Nested Grids", Computing (1997) 59:365-385.

* cited by examiner

Primary Examiner—Almis R. Jankus

(57) ABSTRACT

A method of modeling a three-dimensional object using voxels. The voxels can be subdivided in a variety of methods and marching tetrahedra may also be used to generate the model. Once a voxel has been subdivided, the continuity of the model may be preserved by subdividing only the voxels immediately adjacent to the subdivided voxel. Also, a user interface that enables and facilitates the use of the three-dimensional modeling method.

5 Claims, 11 Drawing Sheets

SUBDIVISION OPERATION AND USER INTERFACE FOR VOLUME SCULPTING

FIELD OF THE INVENTION

This invention relates generally to methods of modeling three-dimensional objects and is also related to user interfaces that enable and facilitate the three-dimensional modeling methods.

BACKGROUND OF THE INVENTION

Sculpting has been shown to be a natural metaphor for the computer-modeling of three-dimensional objects. Hence, a variety of techniques that are analogous to sculpting have been proposed to generate three-dimensional computer models. Some of these techniques make use of small shapes or Constructive Solid Geometry (CSG) primitives that are agglomerated to form a model. Others techniques make use of volume elements, known as voxels, to build the models.

According to these techniques, primitives or voxels are either added to or taken away from the model. According to the carving technique, a large set of primitives or voxels is initially provided and primitives or voxels are gradually removed or "carved away" until a representative model of the object is formed. According to the marching tetrahedra technique, a small set of primitive is defined and repeatedly reproduced until all of the volume inside of an object is filled. Then, the primitives that lie outside of the volume of the object are removed, again leaving a model of the object.

One advantage of techniques analogous to sculpting is that precise numerical control of the vertices of the model, such as would be required for a CAD system, is not needed. A disadvantage of the techniques is that the preciseness of the model is limited by the size and shape of the primitives. Further, breaking down the primitives into smaller shapes, when possible, is problematic because many primitives must be broken down to avoid modeling inconsistencies and many voxels must be added to justify the presence of the added voxels.

Voxel-based techniques do not require the use of primitives with pre-determined shapes. According to voxel-based approaches, the user is presented with a grid of voxels and selects which of the voxels in the grid are inside of the object being modeled and which are outside of the object. Using binary values for the voxels, the voxels outside of the object can be turned off. Then, by forming polygons to contain the voxels that have not been turned off, isosurface approximations to the surfaces of the object being modeled can be extracted and output as a model.

When they are voxel-based, the carving and marching tetrahedra methods can use a three-dimensional geometry, known as a kernel operator, to remove voxels from the model. If voxels need to be added to the model, the kernel operator can perform a fill operation that adds voxels to the model. However, because the size and shape of the kernal operator typically remains fixed, the resolution of the model is limited.

In a related method called sawing, a cross-sectional area is extruded into three dimensions and used as the kernel operator. Cross-sectional areas that are commonly extruded according to the sawing method include circles, polygons, and Bézier curves. However, the sawing operation can also be performed with any other closed path. Nonetheless, the resolution of a model is still limited because the extruded kernel operator is typically not subdivided.

In many three-dimensional modeling techniques, the model of the object can be displayed in real time by a volume rendering technique. When it is voxel-based, the model can be rendered as the set of voxels that have not been turned off or as the isosurfaces of the polygons that contain those voxels. Once rendered, the voxels can be "painted" to match the colors of the portions of the objects that they are representing. However, the model is typically only displayed in a single view, making it difficult to visualize the model in three dimensions.

As voxel-based modeling techniques have been developed, voxel-based interfaces have also been developed and implemented in order to assist users in creating models. Some interfaces include a three-dimensional cursor control device (mouse) and a set of three-dimensional tools that can be used to remove or add voxels. However, most users lack three-dimensional input devices and therefore require two-dimensional interfaces.

Although some two-dimensional interfaces and tools exist that provide sufficient geometric intuition for sculpting three-dimensional objects, substantial training, concentration, and practice is generally required of the users in order to use the tools. In other words, currently available combinations of two-dimensional interfaces and tools for sculpting objects in three dimensions are not intuitive and are therefore difficult to use.

SUMMARY OF THE INVENTION

A user interface for volume sculpting includes a processor, a two-dimensional input device operably connected to the processor, and a display device operably connected to the processor. The processor operates to provide on the display device a first view of a sculpting object and a second view of the object. The first view of the object provides a full, six-degree-of-freedom orientation control of the view.

A method of forming a model of a three-dimensional object includes generating a three-dimensional set of points, grouping the points into a plurality of three-dimensional cells, subdividing a cell in the plurality of cells into multiple subdivisions, locating adjacent cells that contact the subdivisions, and subdividing the adjacent cells to eliminate dangling points.

BRIEF DESCRIPTION OF THE DRAWINGS

The invention will be described by way of example, in the description of exemplary embodiments, with particular reference to the accompanying drawings in which.

DETAILED DESCRIPTION OF THE INVENTION

Figure 1:
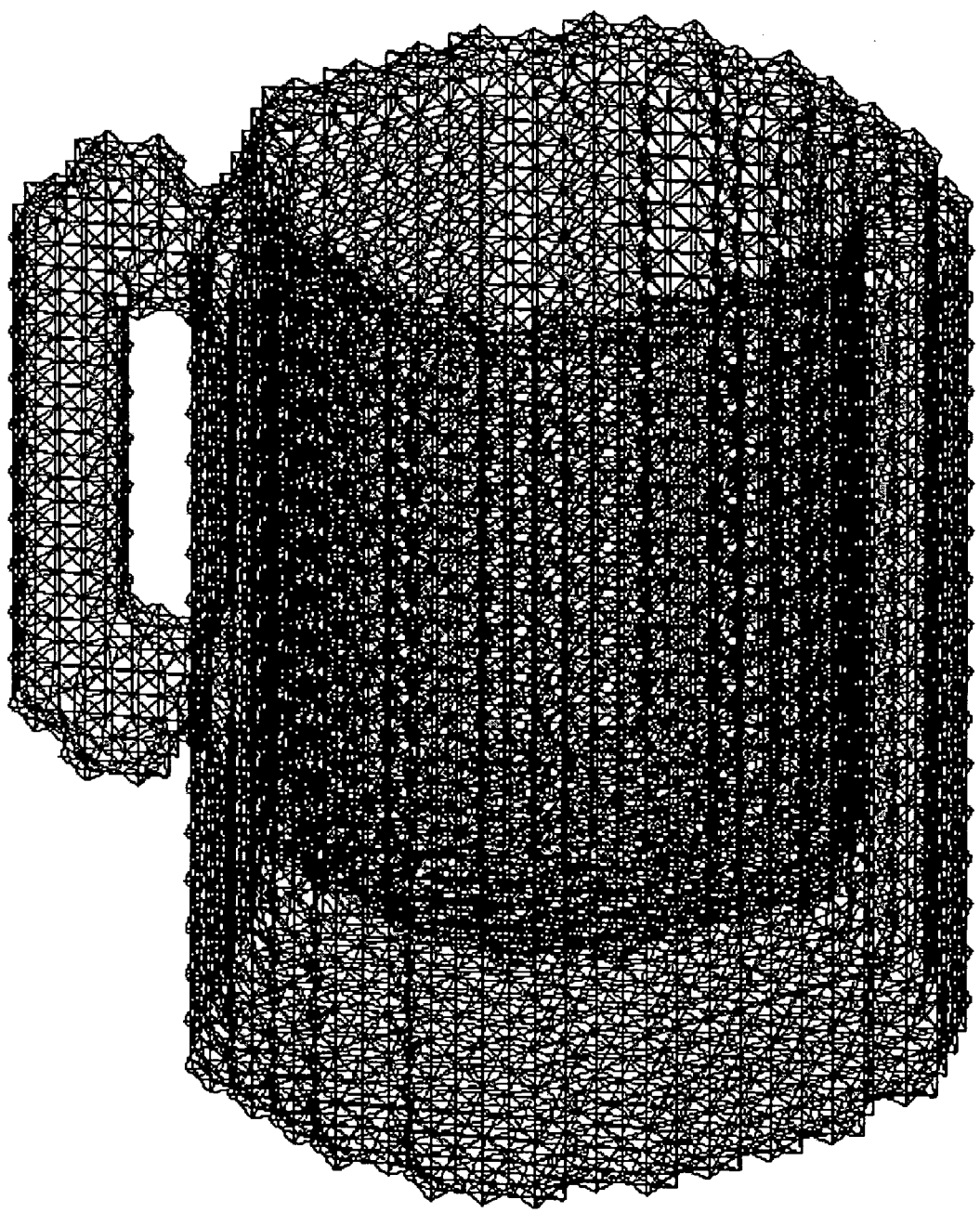
FIG. 1 illustrates a perspective view of a representative model formed according to a method of the present invention.

FIG. 1 illustrates a perspective view of a representative three-dimensional model of an object, a mug 10, as shown. The model can be viewed as a set of triangles that make up the faces of primitives that contain voxels within the boundaries of the model. The representative model in FIG. 1 can be formed by using modeling methods and interfaces according to the present invention. The methods can include the marching tetrahedra method and/or the carving method discussed above. Also, color, lighting, and/or other effects can also be added to the model in order to give it some depth.

Figure 2B:
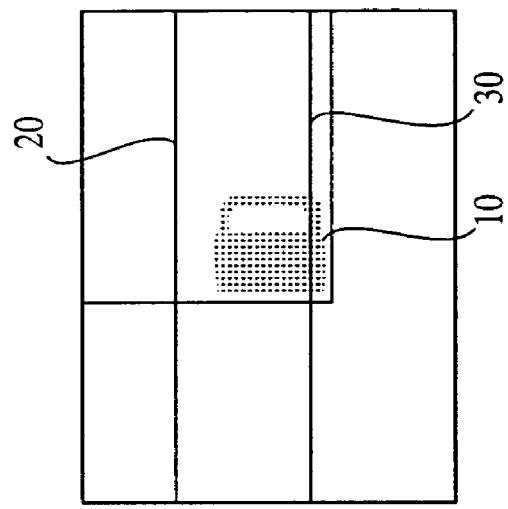
FIG. 2B illustrate a second view a model as it is being formed. This view is oriented at a 90-degree offset to the first view and shows horizontal lines that indicate an extrusion depth.
Figure 2A:
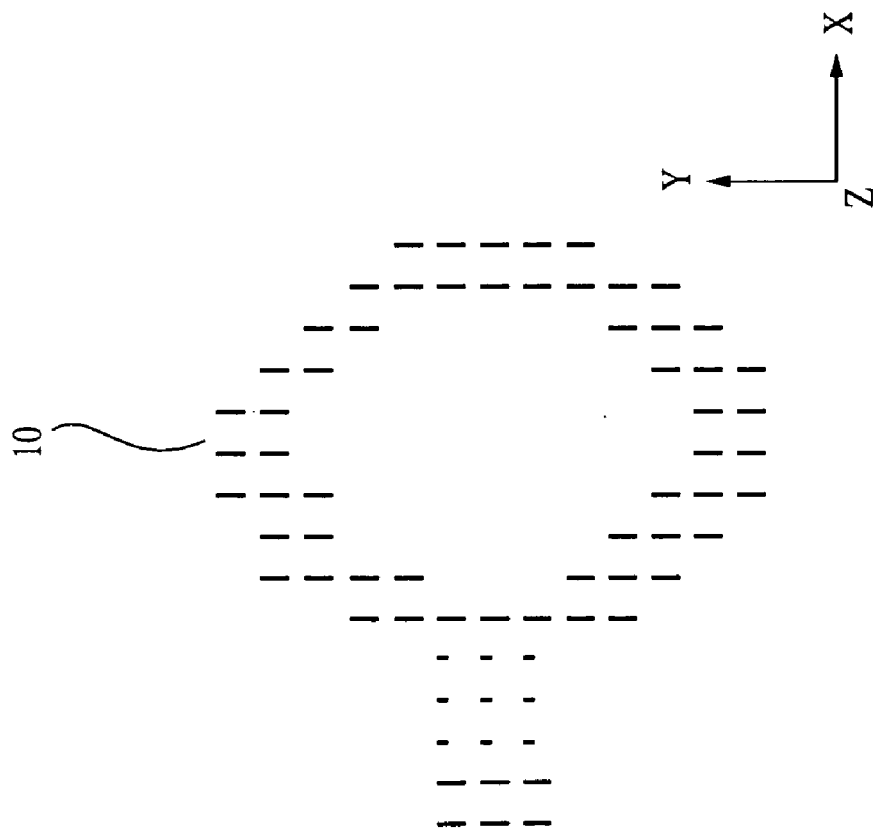
FIG. 2A, illustrate a first view a model as it is being formed. In this plan view, the voxels that are included in the model are shown as thick points.

FIGS. 2A and 2B illustrate two views of the model, in this case a mug 10, as it is being created. These views may be included in a user interface that allows a user to implement certain methods of the present invention. FIG. 2A illustrates a first view that, in this case, is a plan view of a cross-section of the model. In this view, the voxels included in the model are shown as thick points. The first view can be moved with six degrees of freedom and can therefore be moved or rotated fully relative to the model. Thus, any perspective on the model that the user desires can be provided. FIG. 2A also shows how the first view can include a coordinate system, as seen in the bottom, right-hand corner of FIG. 2A.

The second view, illustrated in FIG. 2B, can be fixed in relation to the first view. For example, as shown in FIG. 2B, the second view can be set to be orthogonal, or substantially orthogonal, to the first view. When the first view is moved or redefined, the second view can automatically adjust to remain orthogonal. Also, the distance from which the model is viewed in the second view can be fixed.

Maintaining the orthogonal position of the second view relative to the first view can be done by pre-loading the matrix stack of the modeled object with an offset matrix, then drawing the same object with the same transformations as used in the first view. Also, silhouette artifacts from the surface extraction method can be reduced or eliminated by additional subdivision of the cells.

The horizontal lines 20, 30 illustrated in FIG. 2B indicate an extrusion depth and can be set by a slider (not shown) in the user interface. The horizontal lines 20, 30 can be used to define the depth range in which a carving, filling, adding, and/or painting operation takes place.

Regardless of whether a marching tetrahedra, carving, or other modeling algorithm is used, the first step of forming a three-dimensional model can include generating a three-dimensional grid of voxels. These voxels can then be enclosed by, or grouped within, one or more three-dimensional polygons, primitives, or cells. Cubic cells will be discussed below, but cells of other geometries are also within the scope of the present invention.

The initial number of voxels in the grid can be entered by a user or can be pre-set in the modeling algorithm. Either way, the number of voxels in the grid sets the initial size and/or resolution of the model, with the caveat that more voxels may be added as modeling progresses. For example, in the marching tetrahedra algorithm, more voxels are added each time that a set of cells are reproduced and added.

When added, new voxels can be assigned function values that are averaged from adjacent, neighboring voxels. For example, two neighboring voxels can be averaged to provide a function value for a new voxel along the edge of a cell. When the new voxel is positioned on the face of a cell, four voxels can be averaged. For voxels that are in the interior of a cell, eight neighboring voxels can be averaged.

According to either the marching tetrahedra or carving algorithm, once the voxel grid and one or more cells have been generated, the cell or cells can be subdivided into a cell hierarchy such as an octree. This means that a cell can be subdivided into eight times as many tetrahedra or cells as a non-subdivided cell. For example, in FIG. 3A, a single, cubic cell 40 is illustrated. This single cell 40 is subdivided into eight smaller cells 50 in FIG. 3B, and a representative smaller cell 60 from FIG. 3B is subdivided into eight even smaller cells 70 in FIG. 3C. FIGS. 3B and 3C also show an adjacent cell 80 that has not been subdivided.

Regardless of whether they have been subdivided or not, the cells in a model can contain pointers to the voxels enclosed in the cells and to voxels that are adjacent to the cells. The pointers can be shared between adjacent cells and can be used to create a cross-linked database of geometric information.

In order to maintain consistency of the model, when subdividing a non-subdivided cell adjacent to a subdivided cell, the surfaces of the cells should not contain holes and there should be no unattached or dangling voxels. In order to prevent holes or dangling voxels, non-subdivided cells that are adjacent to subdivided cells can themselves be subdivided into several smaller cells or tetrahedra, as illustrated in FIGS. 3A–D.

Figure 3:
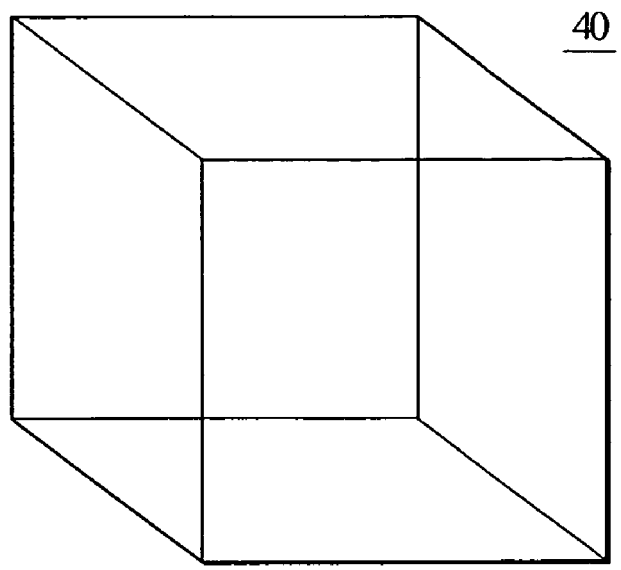
FIGS. 3A–D illustrate a first cell that has been twice subdivided and an adjacent cell that is subdivided according to one embodiment of the present invention to maintain consistency of the model.
Figure 3B:
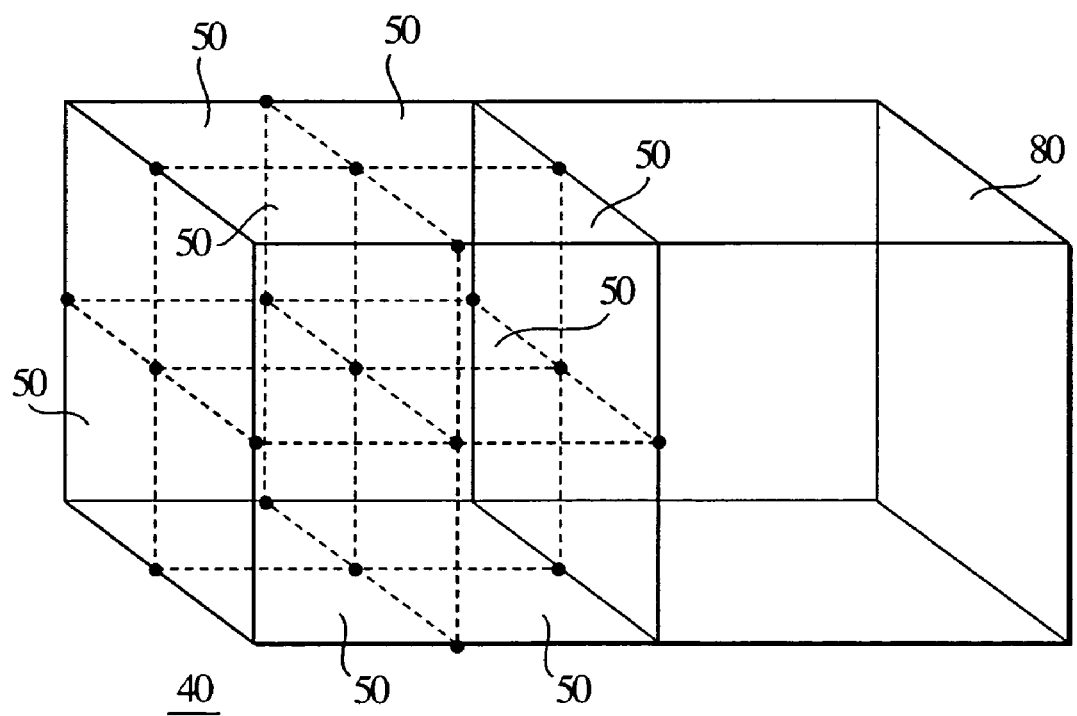
Figure 3C:
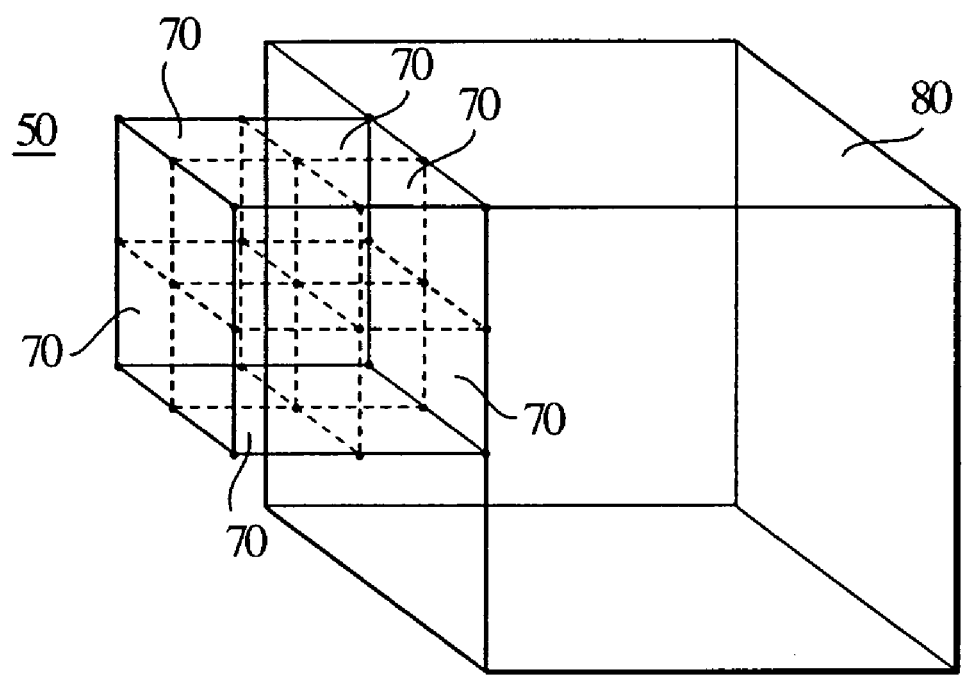
Figure 3:
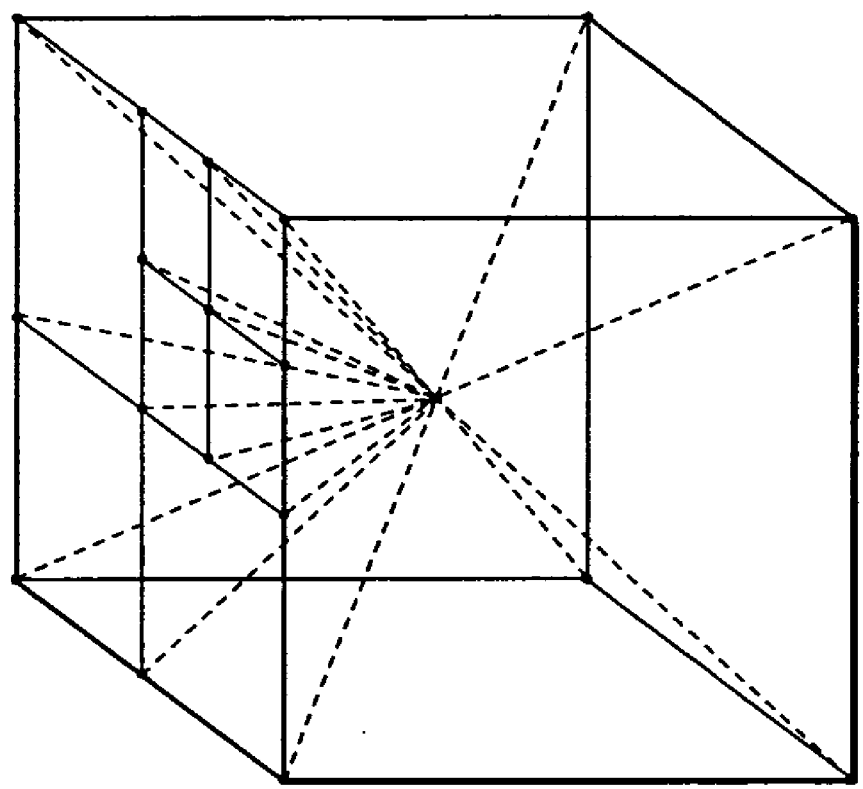

The cell 40 in FIG. 3A has eight voxels (one at each corner). FIG. 3B illustrates how the cell 40 is subdivided into eight smaller cells 50 and also shows an adjacent, non-subdivided cell 80. During the subdivision, nineteen new voxels are added, one in the center of each face, one at the midpoint of each edge, and one at the centroid of the cell 40. FIG. 3C illustrates how one of the smaller cells 50 formed in FIG. 3B is itself subdivided into eight even smaller cells 70, again adding nineteen new voxels at the faces, edges, and centroid of the once-subdivided cell 50.

The eight new voxels that are shared with the face of the adjacent, non-subdivided cell 80 are illustrated in FIG. 3D. In FIG. 3C, these eight new voxels were unlinked to any of the voxels in the adjacent, non-subdivided cell 80 and were therefore dangling voxels. In order to eliminate the dangling voxels, certain embodiments of the present invention create a new voxel at the centroid of the adjacent cell 80 and subdivide the adjacent cell 80 by joining the centroid voxel to the new voxels on the face of the adjacent cell 80 and to the corner voxels of the adjacent cell 80. This subdivision is shown in FIG. 3D and forms a set of pyramids, each having an apex at the centroid of the non-subdivided cell 80 and a square base with corners at four voxels.

In addition, FIG. 3D illustrates two more voxels that have been added at the midpoints of the edges of the adjacent cell 80. These two voxels are joined to the centroid voxel of the adjacent cell 80 and to the voxel in the center of the face of the adjacent cell shared with the eight even smaller cells 70. This joining forms additional pyramids within the adjacent cell 80.

The subdivision operation shown in FIGS. 3A–D allows for the elimination of dangling voxels in the cell 40 while only having to subdivide the adjacent cell 80 a single time. Previously available methods, on the other hand, would have required the adjacent cell 80 to be subdivided multiple times and would have required any cells adjacent to the adjacent cell 80 to also be subdivided to ensure that no dangling voxels were present in the adjacent cell 80.

According to the embodiment of the present invention illustrated in FIGS. 3A–D, the decomposition is such that only one new voxel needs to be added to the adjacent cell 80 in order to eliminate all dangling voxels. Hence, because only one subdivision operation is needed and because the total number of voxels is less than if the adjacent cell 80 had been twice subdivided, the process is simplified. The process is further simplified by the fact that no cells beyond the adjacent cell 80 have to be subdivided.

If the cell 40 had been subdivided more than twice, the adjacent cell 80 would still have required only one subdivision. In such cases, a centroid voxel would again have been added to the adjacent cell 80 and pyramids would again have been created. However, more pyramids, with smaller bases, would have been created.

Figure 4:
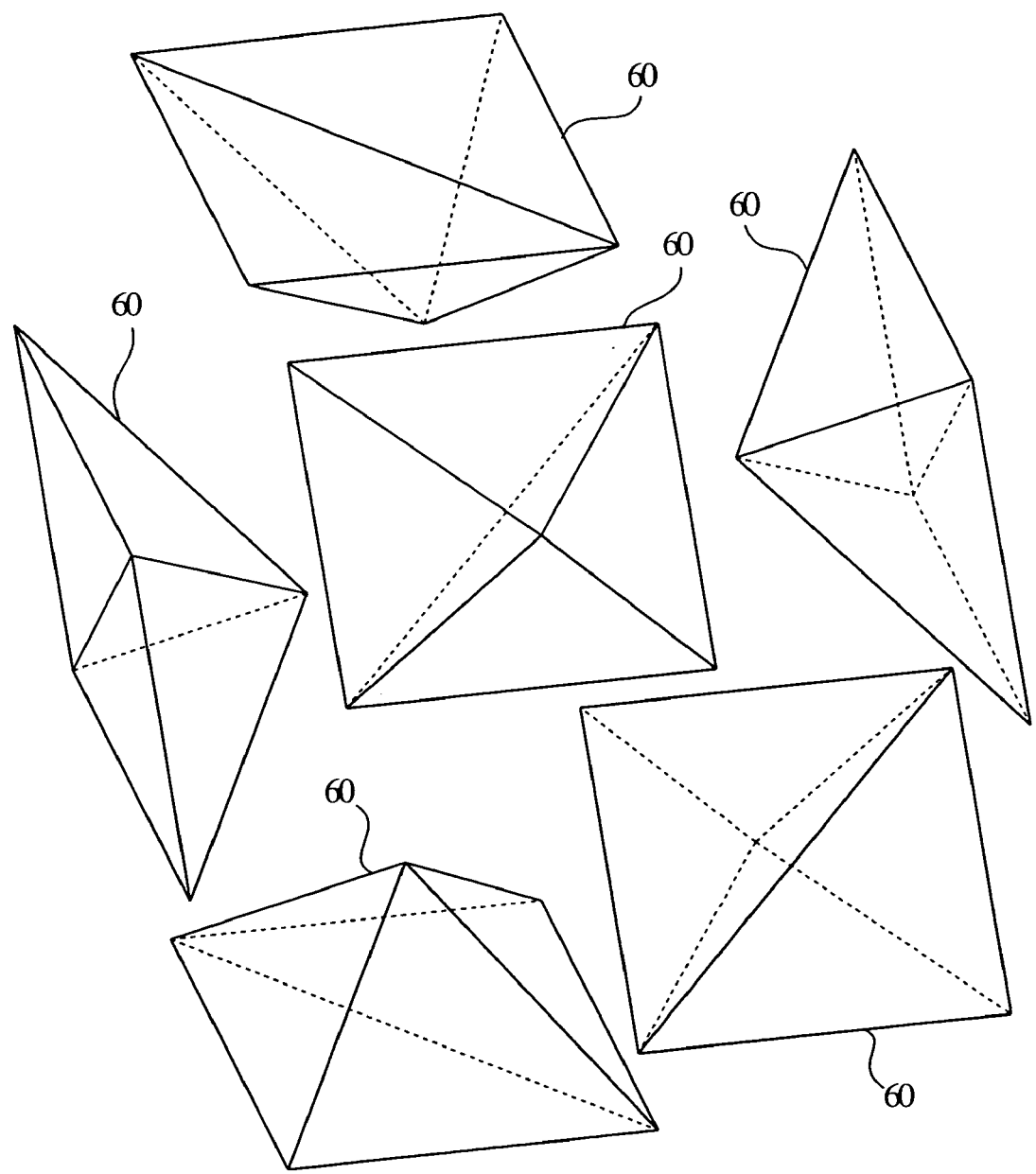
FIG. 4 illustrates the subdivision of a cubic cell into twelve tetrahedra.

In addition to the method discussed above, a cell can be subdivided by a variety of other methods. For example, a first alternate method is illustrated in FIG. 4 and forms a set of pyramids 60, each with five vertices, from a cubic cell (not shown). This method uses each of the faces of the cell as a base and the centroid of the cell as the apex of the pyramids 60. Then, each of the cell faces is divided into two right triangles, inducing in each pyramid 60 two tetrahedra. Thus, twelve tetrahedra can be formed in a cubic cell, as shown in FIG. 4. These tetrahedra are non-overlapping, have triangular faces, and the vertices created along their edges are consistent for all cubic cells that share that edge (e.g., cubic cells adjacent to the cubic cell that was subdivided).

Figure 5:
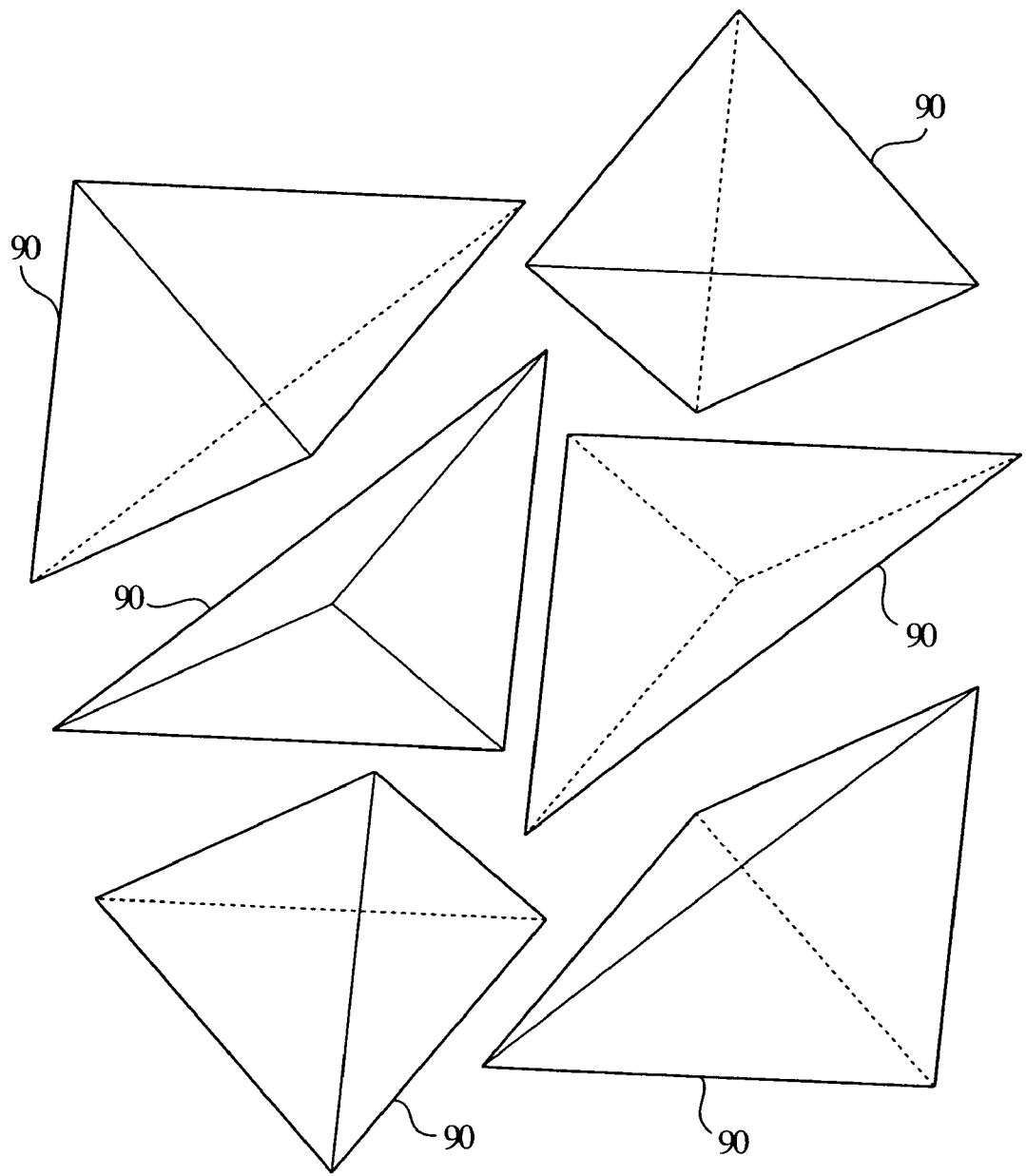
FIG. 5 illustrates the subdivision of a cubic cell into six tetrahedra.

A second alternate method of subdividing a cubic cell is illustrated in FIG. 5 and includes subdividing a cell (not shown) into six tetrahedra 90. This method subdivides each face of the cell into two right triangles. Then, using a vertex on the other side of the cube, this method creates six, non-overlapping tetrahedra.

A third alternate method of subdividing a cell calls for a cubic cell to be subdivided into five tetrahedra. This method is analogous to the methods already discussed and is therefore not illustrated or discussed further at this time.

Regardless of which of the illustrative methods of subdividing a cell discussed above are used, each of the tetrahedra, pyramids, voxels, and cells can be associated with a hierarchical level of subdivision based on how many subdivision operations they have undergone. When a voxel and an adjacent cell are two or more levels of hierarchy apart, a subdivision operation according to the present invention may need to be performed to eliminate dangling voxels.

The subdivision method that forms twelve tetrahedra creates tetrahedra that have a small aspect ratio and that are more likely to lead to small aspect ratios in the final triangles of the model. Among the disadvantage of choosing a method that creates twelve tetrahedra are that the method will almost surely create more triangles and that it will require further interpolation of the volume properties of cells at their centroids. However, this latter concern is minor, since linear interpolation can be used both in creating the centroid and in creating the final triangle vertices.

The subdivision operations discussed above can be used in conjunction with the previously mentioned marching tetrahedra and carving algorithms. In the marching tetrahedra algorithm, the cells that are partially outside the volume being modeled can be subdivided and the subdivisions that remain outside of the model can be selectively removed. Because entire cells no longer need to be removed, the resolution of the model is enhanced. Similarly, in the carving algorithm, the cells that lie partially outside of the model can be subdivided and subdivided portions can be selectively removed.

The methods of the present invention not only give the user the opportunity to remove portions of the model on an effectively arbitrary level of detail, but also give the user greater flexibility in concentrating effort on the parts of the model that are of particular interest at a given time. While the elimination of dangling voxels previously required that many cells or primitives in the model be subdivided, according to certain embodiments of the present invention, only the cells immediately adjacent to the dangling voxels now require subdivision. Also, when used in conjunction with a user interface that provides views such as, but not limited to, those illustrated in FIGS. 2A–B, a user can view the model continuously as it is being formed and only the surfaces of the cells affected by the subdivision operations need to be updated.

While the use of smaller cell subdivisions enhances the overall resolution of the model, the possibility of locally subdividing cells allows for the presence of larger cells in portions of the model where no small features are present. Hence, the total number of voxels and cells in the model can be reduced or minimized.

According to certain embodiments of the present invention, both a voxel grid and a hierarchical structure of cells is sometimes maintained. In such embodiments, carving can be done on the voxel grid while subdivisions and surface extractions, such as the marching tetrahedra method, can be performed by traversing the cell hierarchy. The same is true of filling operations that put additional voxels and/or cells into the model and painting operations that give the model color.

Both the voxels and cell data structures can track their level of subdivision within the hierarchy. For example, a non-subdivided cell and all voxels within it can be placed at a top level of hierarchy. A once-subdivided cell and all voxels within it would then be one level below the non-subdivided cell, and so on. During surface extraction, when a cell has a mixture of voxels that are at the hierarchical level of the cell level, such as the voxels in the center of the cell, and voxels that are below the cell's level in the hierarchy, such as the voxels on a face of the cell, the cell can be identified as being adjacent to a subdivided cell. Once such an identification has been made, according to certain embodiments of the present invention, a new subdivision operation can automatically be triggered.

Any original subdivision scheme can be adapted to the present invention. For example, a subdivision scheme that maintains consistent subdivisions between adjacent cells can be used in conjunction with the method that forms six tetrahedra per cell. This subdivision scheme can use a rotation scheme to maintain consistent ordering of the vertices across cells. The twelve-tetrahedra-per-cell method can also be used, taking advantage of the inherent symmetry of the subdivisions.

There are, however, two cases that require special handling of adjacent, non-subdivided cells. The first case has to do with an adjacent face that is subdivided and the second case has to do with an adjacent edge that is subdivided.

Figure 6:
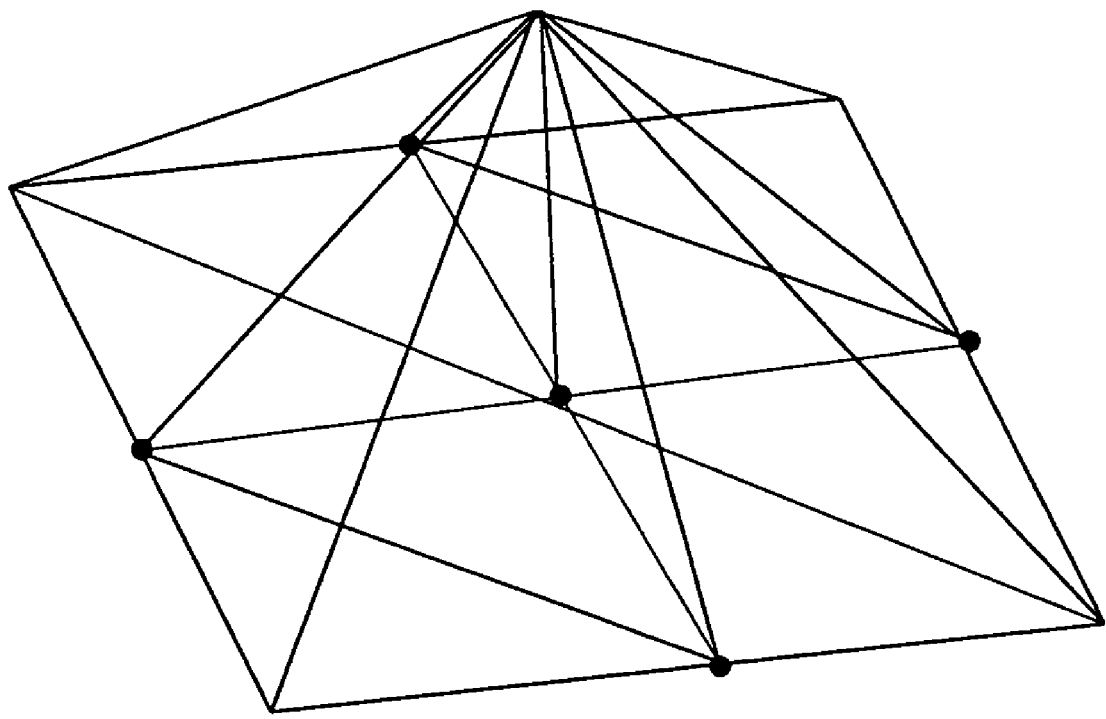
FIG. 6 illustrates a subdivision of the face of a cell that is adjacent to a cell that has been subdivided into twelve tetrahedra.

In the first of these cases, illustrated in FIG. 6, for each tetrahedron with a face in a subdivided face, the voxels created by subdivision can be connected to the apex of the tetrahedron and to the diagonally adjacent voxel within the same tetrahedron. Since each tetrahedron has exactly one face coincident with a cell face, local control of changes to volume can be maintained.

Figure 7:
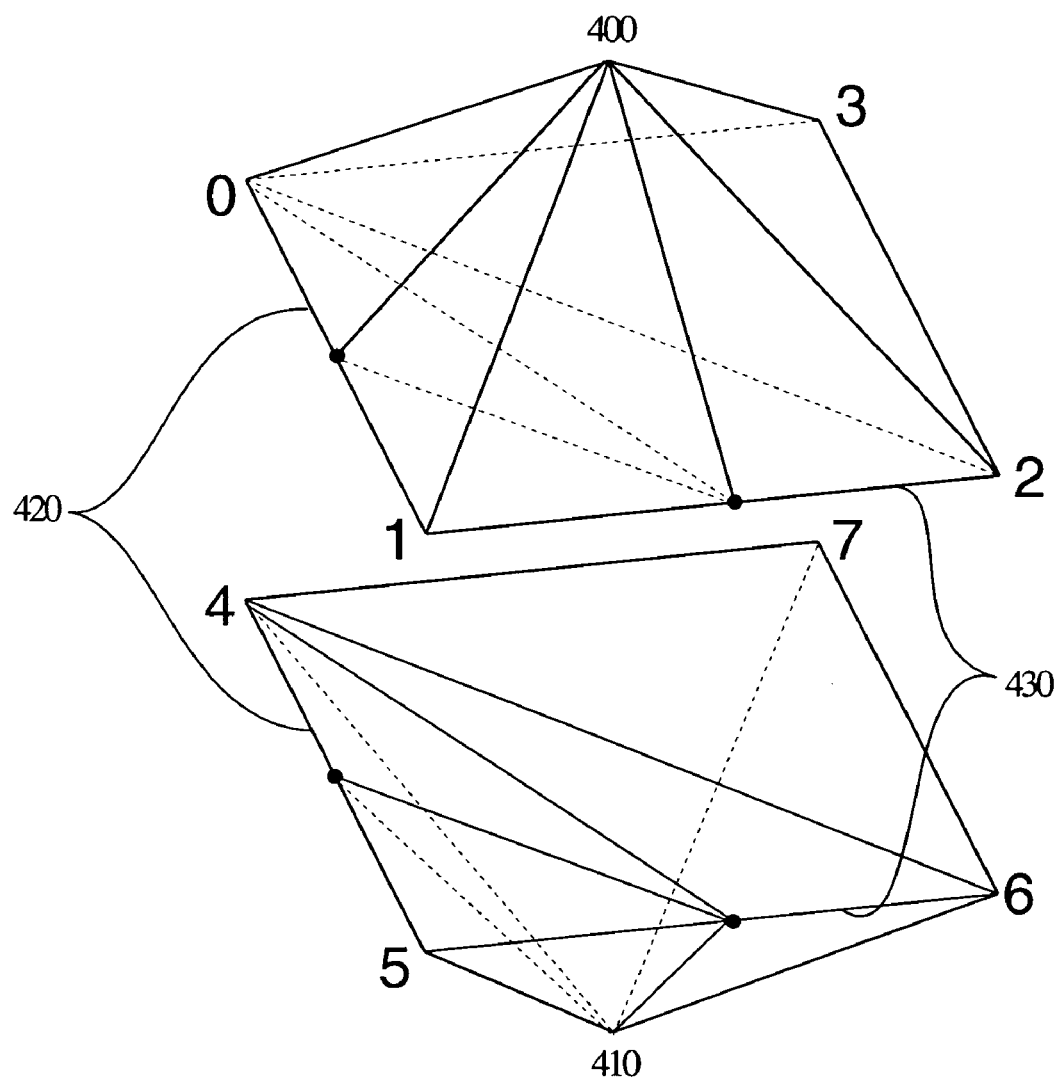
FIG. 7 illustrates a subdivision of the edge of a cell that is adjacent to a cell that has been subdivided into twelve tetrahedra.

For adjacent edges that are subdivided, extra bookkeeping is necessary. Starting with the original decomposition, a subdivided edge can split the original tetrahedron in which it lies into two tetrahedra, as shown in FIG. 7.

If multiple edges are subdivided, considering them in sequence creates a set of non-overlapping tetrahedra with voxels (and the centroid of the cell) as vertices. The subdivision scheme can therefore carefully order the edges (in this case, from 0 to 7), as shown in FIG. 7. In this example, two edges 420, 430, both in tetrahedra 400, 410 of two adjacent cells (not shown), are subdivided and voxel 0 for the upper cell corresponds to voxel 4 for the lower cell, etc. When subdividing, the upper cell examines the "2-1" edge first and the lower cell examines the "5-6" edge first. The ordering creates in the shared face the same tetrahedral (and model) edges. Then, the second voxel, introduced by subdivision in the lower tetrahedra, uses the first new voxel (in the top tetrahedra) to complete the subdivision operation and this algorithm again maintains local control.

The carving operations in the known volume sculpting method can be adapted to the present invention. For example, to achieve a tapered three-dimensional operator, a cross-section can be used as a wide cross-section and the edges can be tapered from the middle of the extrusion range to the ends for an ellipsoidal operator. Alternately, the edges can be tapered from the near to the far boundaries of the extrusion range for cone or pyramid operators. Thus, certain embodiments of the present invention can approximate a CSG-based modeler.

Certain embodiments of the present invention can help to infer an appropriate function value at the voxels that are near a user-defined boundary. This can provide smoother surfaces from operators that do not or cannot operate along a rectilinear voxel grid. This also can reduce artifacts that are sometimes seen in the silhouettes of three-dimensional models.

Figure 8:
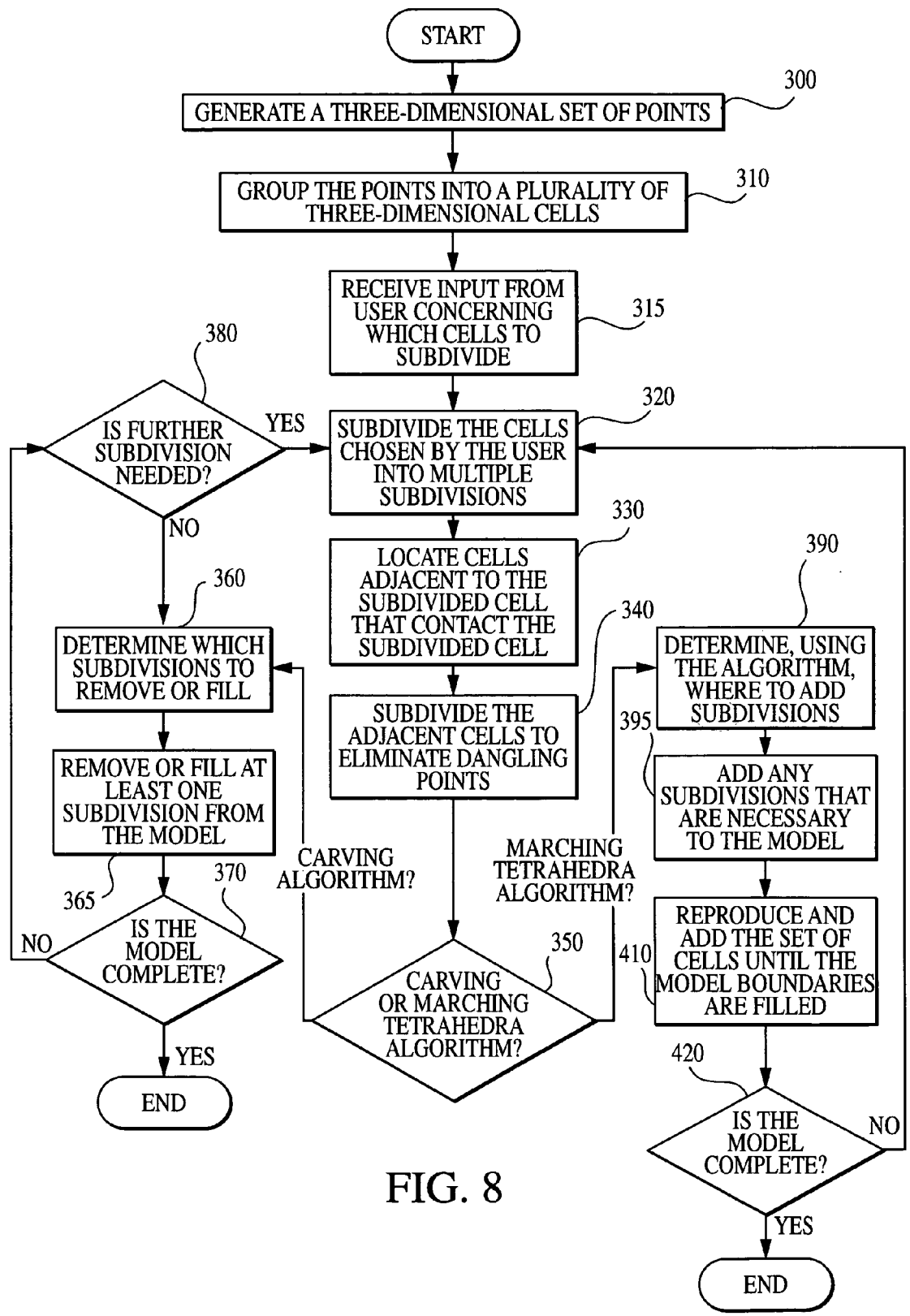
FIG. 8 illustrates a flowchart of method of forming a three-dimensional model of an object using a carving algorithm and/or a marching tetrahedra algorithm.

FIG. 8 illustrates a flowchart that defines the steps of modeling methods according to several embodiments of the present invention. Step 300 specifies that a three-dimensional set of points can be generated at the outset of modeling. The points can be chosen to be, among other items, voxels and the exact number of points or voxels generated can be pre-set or can be input by the user. Further, at a later time, more voxels can be added, should they become necessary.

Step 310 specifies that the voxels be grouped in a plurality of three-dimensional cells. Although, many modeling primitives with many different geometries may be used, the cubic voxels discussed above are well suited to certain embodiments of the present invention.

Step 315 calls for a user to input which cells to subdivide and step 320 calls for the cells chosen by the user to be subdivided into multiple subdivisions. As discussed above, a cell may be subdivided according to the methods illustrated in FIGS. 3A–D, and/or 4–7, wherein a cell may be divided into, for example, six, eight, or twelve subdivisions. Further, any other method that suits the needs of a user to obtain desired modeling resolution is within the scope of the present invention.

Step 330 specifies that cells adjacent to the subdivided cell be located. The adjacent cells typically share at least a portion of a face or edge with the subdivided cell and are typically at least one level of geometric hierarchy away from the subdivided cell.

Step 340 calls for the adjacent cells located in step 330 to be subdivided. According to certain embodiments, such as those illustrated in FIGS. 3A–D, the adjacent cells each only have one point, or voxel, added to them. However, the single-point-per-adjacent-cell addition can be enough to eliminate all dangling points in the model. Hence, this step can make it unnecessary to subdivide cells beyond the adjacent cells since all dangling points have already been removed. Further, according to certain embodiments, the subdivision of the adjacent cells can be performed automatically (i.e., without requesting input from a user).

Step 350 is a decision block that assesses whether the modeling technique being used is a carving algorithm or a marching tetrahedra algorithm. In the carving algorithm, all of the cells needed to model an object are generally included at the outset. Hence, all that remains is to subdivide cells and to remove subdivisions and/or cells. In the marching tetrahedra algorithm, on the other hand, the initial set of cell is generally formed into a suitable template, reproduced iteratively, and the reproduced templates are added to the model until all of the volume within the object being modeled is filled. Then, portions of the templates that lie outside of the volume are carved away.

Steps 360 through 380 detail how some carving algorithm embodiments are implemented. According to step 360, which subdivisions to remove or fill is determined and, according to step 365, at least one of the subdivisions is either removed or filled. According to certain embodiments of the present invention, cells can also be removed if none of the volume that they occupy is desired in the model. Step 370 then asks if the model is complete pursuant to the performance of step 360. If the model is as representative of the object being modeled as the user desires, then the algorithm stops. On the other hand, if subdivision of additional cells within the model and/or the removal or filling of additional subdivisions would make the model more representative of the object, then there is either a return to step 360 or step 320. Whether the next step is step 320 or step 360 is determined at decision block 380, which determines further subdivision of cells is necessary.

In the marching tetrahedra algorithm, represented by steps 390 through 420, step 390 specifies that a determination be made, within the algorithm, concerning where to add subdivisions to the model. Then, step 395 calls for the addition of any necessary subdivisions to the model. Step 420 then asks whether the model is complete. If the model is complete at that point, the modeling process ends. However, if the model is not complete, decision block 420 loops back to step 320, which subdivides cells and eventually leads to further subdivisions and removals of cells and/or subdivisions.

In addition to the steps illustrated in FIG. 8, certain embodiments of the present invention include the step of painting the points or voxels of the model. According to these embodiments, color values can be assigned to each point or voxel, thus adding to the clarity of the model or making the model more aesthetically pleasing. For example, points may be shaded to represent depth or colors from a photograph of the object being modeled may be superimposed on the model.

The embodiments of the present invention that have been discussed thus far have been related to methods of generating voxel-based models of objects. The embodiments discussed below, on the other hand, relate to simplified user interfaces for generating the models. These interfaces can operate in three dimensions and can allow users to view a three-dimensional model in all dimensions simultaneously. Also, they can eliminate the need for a three-dimensional device and can minimize or eliminate the need for a user to position operators simultaneously in three dimensions. Hence, a user can think in two dimensions at a time instead of having to think in three dimensions.

Figure 9:
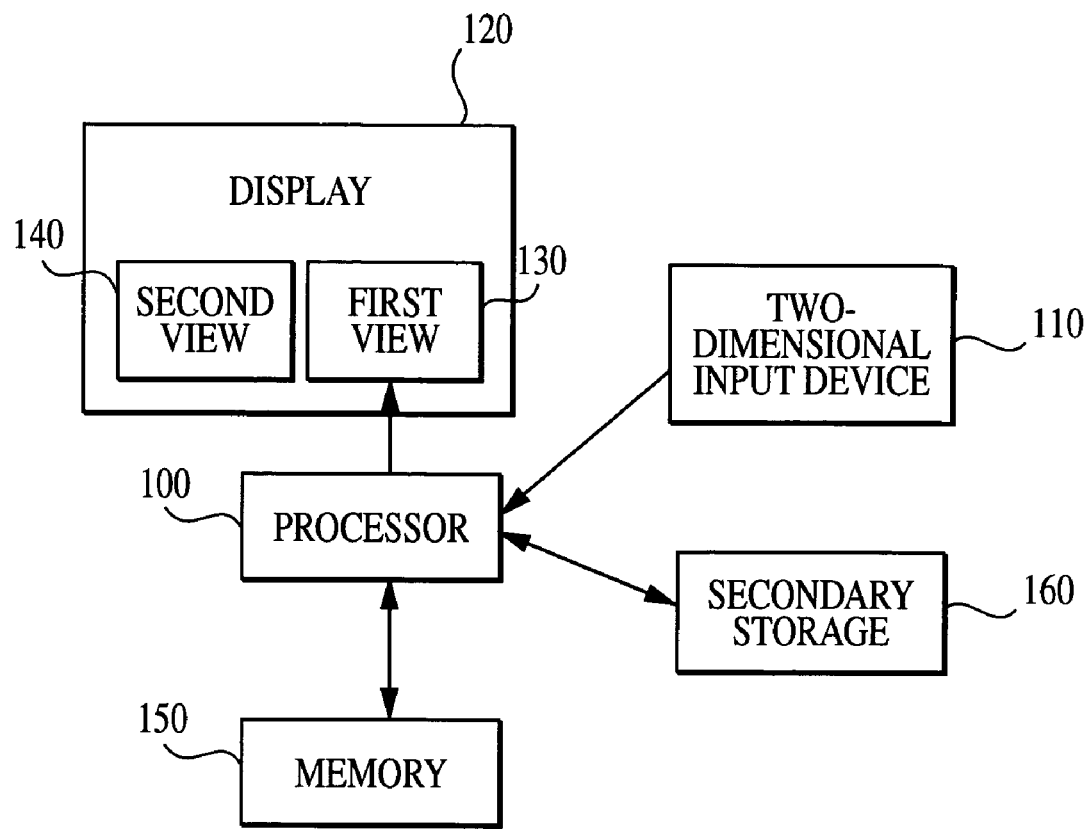
FIG. 9 illustrates a system and user interface to execute methods according to the present invention.

An interface according to the present invention is illustrated in FIG. 9. The interface can include a processor 100, such as a computer, a two-dimensional input device 110, such as a cursor control device, a touchscreen, a trackball, or a mouse, and a display device 120, such as a computer screen. The two-dimensional input device 110 can be operably connected to the processor, as can the display device 120. The display device 120 can provide the first view 130 and second view 140 of the object, as discussed above. The interface can also include a memory 150 and a secondary storage 160 for storing data or applications for execution by the processor 100. In particular, processor 100 can execute software routines used to implement those methods shown in FIG. 8.

Once a model has been formed, texture mapping of the model can be added to improve the quality of the model. In order to add texture mapping, a two-dimensional texture map can be introduced. Then, the map can be projected onto the model to compute texture coordinates for the voxels. Three-dimensional textures can also be applied according to other methods known in the art.

The foregoing detailed description has been given for understanding exemplary implementations of the invention only and no unnecessary limitations should be understood therefrom as modifications will be obvious to those skilled in the art without departing from the scope of the appended claims and their equivalents.

What is claimed is:

1. A user interface for volume sculpting comprising:
a processor;
a two-dimensional input device operably connected to the processor; and
a display device operably connected to the processor and wherein the processor operates to provide on the display device concurrent viewing of both a first view of a sculpting object and a second view of the object, the first view of the object providing a full, six-degree-of-freedom orientation control of the view.

2. The user interface of claim 1, wherein the first view comprises a cross-sectional area of the object.

3. The user interface of claim 1, wherein the second view is fixed in orientation in relation to the first view.

4. The user interface of claim 3, wherein the second view is fixed in position in relation to the first view.

5. The user interface of claim 3, wherein the second view is orthogonal to the first view.

* * * * *